US010394745B2

(12) United States Patent
Compton et al.

(10) Patent No.: US 10,394,745 B2
(45) Date of Patent: Aug. 27, 2019

(54) ADAPTER SELECTION BASED ON A QUEUE TIME FACTOR

(71) Applicant: International Business Machines Corporation, Armonk, NY (US)

(72) Inventors: Scott B. Compton, Hyde Park, NY (US); Mariann Devine, Poughkeepsie, NY (US); Dale F. Riedy, Poughkeepsie, NY (US); Peter B. Yocom, Lagrangeville, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 15/941,196

(22) Filed: Mar. 30, 2018

(65) Prior Publication Data

US 2018/0225243 A1 Aug. 9, 2018

Related U.S. Application Data

(63) Continuation of application No. 15/066,123, filed on Mar. 10, 2016, now Pat. No. 9,984,018, which is a (Continued)

(51) Int. Cl.
*G06F 13/00* (2006.01)
*G06F 13/40* (2006.01)
(Continued)

(52) U.S. Cl.
CPC ...... *G06F 13/4068* (2013.01); *G06F 9/45558* (2013.01); *G06F 13/366* (2013.01);
(Continued)

(58) Field of Classification Search
CPC ............. G06F 13/4068; G06F 13/4063; G06F 13/382; G06F 13/366; G06F 9/45558;
(Continued)

(56) References Cited

U.S. PATENT DOCUMENTS 8,250,252 B1 8/2012 Konda et al.
8,479,214 B2 * 7/2013 Green .................. G06F 9/4881 718/101
(Continued)

FOREIGN PATENT DOCUMENTS

WO 2014073024 A1 5/2014

OTHER PUBLICATIONS

"SAN Performance Metrics" by EMC, Sep. 25, 2012. (Year: 2012).*
(Continued)

*Primary Examiner* — Jing-Yih Shyu
(74) *Attorney, Agent, or Firm* — Cantor Colburn LLP; William Kinnaman

(57) ABSTRACT

A method, system, and computer program product are described for a machine selecting a selected adapter among two or more adapters that perform a same function. The method includes generating a request, at the machine, for the function, and calculating a time indicator associated with each of the two or more adapters based on a respective adapter queue time factor (QTF) associated with each of the two or more adapters, the adapter QTF associated with each of the two or more adapters being a computed value. The method also includes selecting the selected adapter and submitting one or more requests to the selected adapter of the two or more adapters to perform the function based on a comparison of the time indicator associated with each of the two or more adapters.

6 Claims, 4 Drawing Sheets

Related U.S. Application Data continuation of application No. 14/922,656, filed on Oct. 26, 2015, now Pat. No. 9,984,031.

(51) Int. Cl.
*G06F 13/366* (2006.01)
*G06F 17/11* (2006.01)
*G06F 9/455* (2018.01)
*G06F 13/38* (2006.01)

(52) U.S. Cl.
CPC ............ *G06F 17/11* (2013.01); *G06F 13/382* (2013.01); *G06F 13/4063* (2013.01); *G06F 2009/4557* (2013.01); *G06F 2009/45579* (2013.01); *G06F 2009/45595* (2013.01)

(58) Field of Classification Search
CPC ............. G06F 17/11; G06F 2009/4557; G06F 2009/45579; G06F 2009/45595
See application file for complete search history.

(56) References Cited

U.S. PATENT DOCUMENTS

| | | | | |
|---|---|---|---|---|
| 8,503,468 | B2 | 8/2013 | Akyol et al. | |
| 8,599,941 | B2 | 12/2013 | Hamamura | |
| 8,675,674 | B2 | 3/2014 | Saha et al. | |
| 9,354,813 | B1 * | 5/2016 | Dolan | G06F 3/0647 |
| 2005/0131564 | A1 | 6/2005 | Chen et al. | |
| 2006/0259905 | A1 | 11/2006 | Diao et al. | |
| 2008/0147920 | A1 * | 6/2008 | Mohan | G06F 3/0613 710/58 |
| 2010/0182920 | A1 * | 7/2010 | Matsuoka | H04L 43/00 370/252 |
| 2010/0306779 | A1 * | 12/2010 | Yengulalp | G06F 9/5038 718/103 |
| 2011/0078334 | A1 * | 3/2011 | Arakawa | G06F 3/0607 710/3 |
| 2012/0079495 | A1 | 3/2012 | Conti et al. | |
| 2012/0239376 | A1 * | 9/2012 | Kraft | G06F 9/45533 703/22 |
| 2014/0358914 | A1 | 12/2014 | Lu et al. | |
| 2014/0359160 | A1 | 12/2014 | Elhaddad et al. | |
| 2015/0055456 | A1 | 2/2015 | Agarwal et al. | |
| 2015/0120907 | A1 * | 4/2015 | Niestemski | H04L 67/1097 709/224 |
| 2015/0234675 | A1 | 8/2015 | Steiss | |
| 2017/0116144 | A1 | 4/2017 | Compton et al. | |
| 2017/0116149 | A1 | 4/2017 | Compton et al. | |

OTHER PUBLICATIONS

"Queue Depth, IOPS and Latency" by Scott Howard, Oct. 26, 2015. (Year: 2015).*

"How to calculate suitable LUN queue depths" by HP, Oct. 2015. (Year: 2015).*

List of IBM Patents or Patent Applications Treated as Related; (Appendix P), Filed Mar. 30, 2018; 2 pages.

Scott B. Compton et al., "Adapter Selection Based on a Queue Time Factor", U.S. Appl. No. 15/941,186, filed Mar. 30, 2018.

Casale et al., "A Model of Storage I/O Performance Interference in Virutalized Systems", IEEE, 2011, pp. 1-6.

Prof. Dr. Christian Terwiesch, "Calculation of the time in the queue with multiple resources", pp. 1-2, Jul. 4, 2013, retrieved from https://lecturenotesblog.wordpress.com/2013/07/04/calculation-of-the-time-in-the-queue-with-multiple-resources/.

Prof. Dr. Christian Terwiesch, "Calculation of the time in the queue/waiting time", pp. 1-2, Jul. 4, 2013, retrieved from https://lecturenotesblog.wordpress.com/2013/07/04/calculation-of-the-time-in-the-queue-waiting-time/.

* cited by examiner

ADAPTER SELECTION BASED ON A QUEUE TIME FACTOR

DOMESTIC BENEFIT/NATIONAL STAGE INFORMATION

This application is a continuation of U.S. application Ser. No. 15/066,123 filed Mar. 10, 2016 issued as U.S. Pat. No. 9,984,018 on May 29, 2018 which claims priority to U.S. application Ser. No. 14/922,656 filed Oct. 26, 2015 issued as U.S. Pat. No. 9,984,031 on May 29, 2018, the disclosures of both of which are incorporated by reference herein in their entirety.

BACKGROUND

The present invention relates to adapter selection, and more specifically, to adapter selection based on a queue time factor.

In computing systems, input/output adapters (I/O adapters) are electronic circuits (e.g., expansion card, plug-in module) that accept inputs, perform some transformation (e.g., compression, sorting), and provide the transformed data as output. An adapter may be shared by multiple machines or by multiple logical partitions, referred to as virtual machines (self-contained operating environments that behave like individual computers). The use of adapters allows the central processing unit (CPU) core processor of the machine or VM to perform other tasks rather than those done by the adapters. In some environments, each machine or virtual machine (VM) is unaware of the amount of work that other machines or VMs may have sent to the same adapter for processing and output.

SUMMARY

Embodiments include a method, machine, and a computer program product for a machine selecting a selected adapter among two or more adapters that perform a same function. Aspects include generating a request, at the machine, for the function; calculating a time indicator associated with each of the two or more adapters based on a respective adapter queue time factor (QTF) associated with each of the two or more adapters, the adapter QTF associated with each of the two or more adapters being a computed value; and selecting the selected adapter and submitting one or more requests to the selected adapter of the two or more adapters to perform the function based on a comparison of the time indicator associated with each of the two or more adapters.

DETAILED DESCRIPTION

As noted above, an adapter may be shared among multiple physical machines or VMs. Further, in some environments, the machines or VMs are unaware of how many elements or submissions have already been submitted by other machines or VMs. In addition, each machine or VM may have access to more than one adapter to complete the same function. Thus, if a machine or VM were aware of how many total submissions were already pending (from all machines or VMs) for each available adapter (the total queue depth), the machine or VM could select the adapter that would complete its request in the least amount of time. However, each machine or VM is only aware of the number of requests that it has submitted (the local queue depth). The time (indicated by a time stamp) from submission of a request to a given adapter until the time (indicated by another time stamp) that the adapter begins to process the submitted element is referred to as the queue time. Each machine or VM may maintain an average queue time for its submissions at each adapter. However, because a given machine or VM is unaware of the total number of submissions already queued in a given adapter (because submissions by other machines or VMs are not visible), the average queue time is not an accurate reflection of the time it may take for the next submission from the machine or VM to be processed. That is, based on the local queue depth in combination with the average queue time, the machine or VM may choose a particular adapter, but, if several submissions were made by other machines or VMs to the same adapter in the meantime, the actual queue time for the machine or VM's latest submission would be significantly higher than the local queue depth might indicate. Embodiments of the systems and methods detailed herein relate to the use of a queue time factor in selecting an adapter. The queue time factor mitigates the fact that the total queue depth at the adapter will be unknown to each machine or VM if more than one machine or VM submits requests to the adapter. While the discussion below specifically references VMs for explanatory purposes, the embodiments also apply to multiple machines that share a processing resource, such as an I/O adapter, without knowledge of how many other machines are also accessing that resource.

Figure 1:
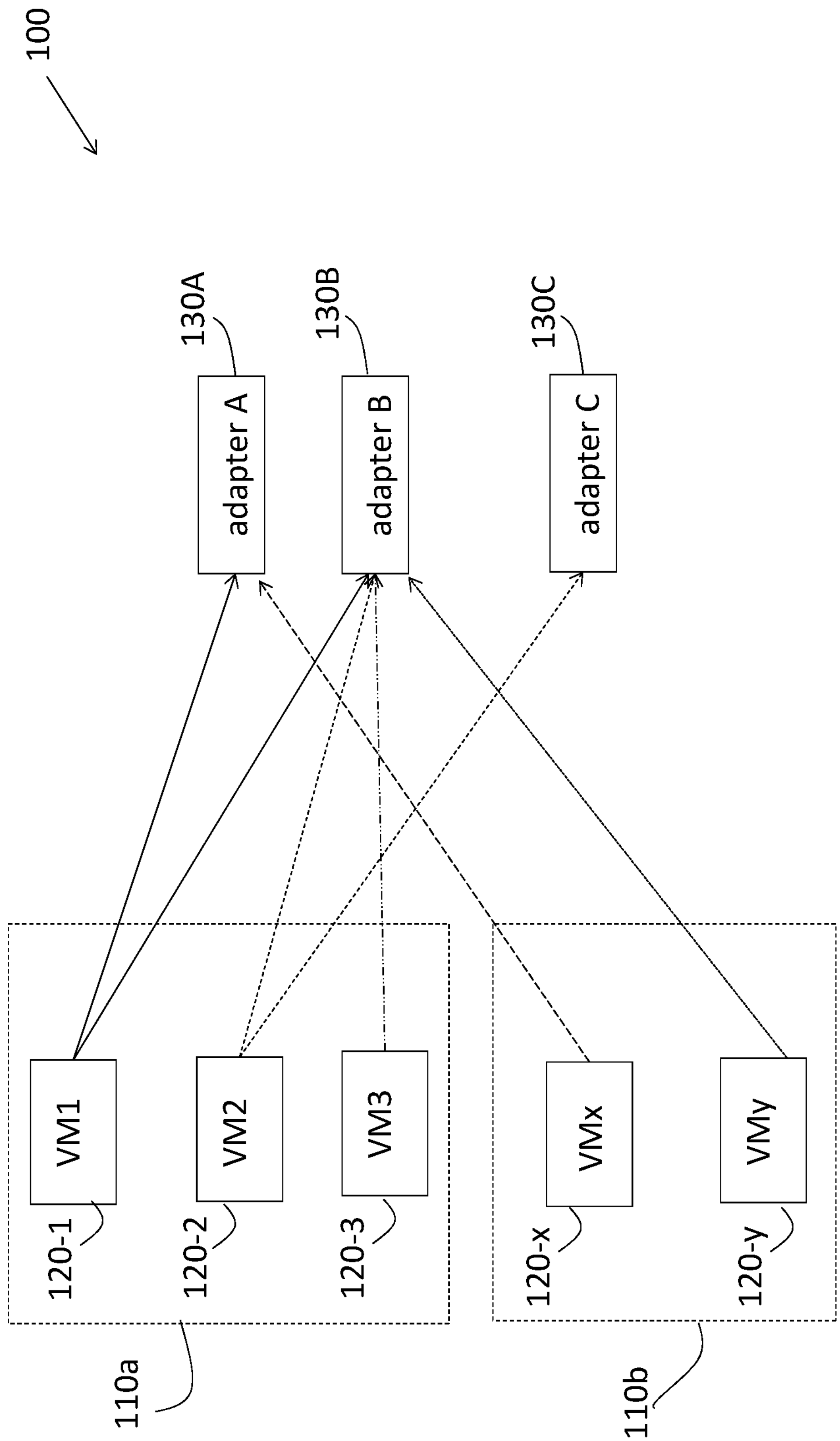
FIG. 1 is a block diagram of an exemplary system in which VMs select adapters according to embodiments.

FIG. 1 is a block diagram of an exemplary system 100 in which VMs 120 select adapters 130 according to embodiments detailed herein. The VMs 120 may be in one or more physically housed computing systems 110. The exemplary system 100 includes two computing systems 110*a*, 110*b*. In the exemplary case shown in FIG. 1, computing system 110*a* includes virtual machines VM1 120-1, VM2 120-2, and VM3 120-3, and computing system 110*b* includes virtual machines VMx 120-*x* and VMy 120-*y*. As FIG. 1 shows, every VM 120 may not have access to every adapter 130. For example, while VM1 120-1 may use adapter A 130A or adapter B 130B, VMy 120-*y* may only use adapter B 130B. Four different VMs 120-1, 120-2, 120-3, 120-*y* may use adapter B 130B while only one VM 120-2 may use adapter C 130C. Yet, VMs 120-1, 120-2, 120-3, 120-*y* do not have knowledge of the high traffic on adapter B 130B any more than VM2 120-2 has knowledge that it is the only VM 120 with access to adapter C 130C. If the VMs 120 did have knowledge of adapter 130 usage by other VMs 120, then VM2 120-2 could always select adapter C 130C, for example, because VM2 120-2 has no competition for the resources of adapter C 130C. In the absence of this knowledge, a queue time factor (QTF) is computed and used by each VM 120 according to embodiments discussed further below.

Figure 2:
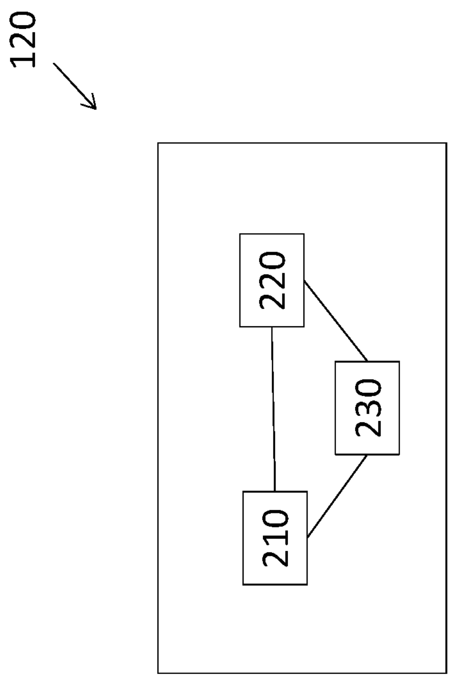
FIG. 2 is a block diagram of components associated with each VM according to embodiments.

FIG. 2 is a block diagram of components associated with each VM 120 according to embodiments. While a VM 120 is an emulation of a computer system (a software implementation of a machine (e.g., computer)), each VM 120 is associated with the components discussed herein. Some of those components may be shared with one or more other VMs 120. The VM 120 includes one or more memory devices 210 and one or more processors 220. The components associated with the VM 120 also include an interface 230 to receive input and provide output. The memory device 210 stores instructions to be implemented by the VM 120. These instructions include instructions for the processor to implement processes, discussed below, that are used to select an adapter 130. The memory device 210 may also store data input to or generated by the VM 120. The interface 230 may allow both user input and input from other VMs 120 or other machines (e.g., wirelessly). The interface 230 may also allow output to a user (e.g., via a display) or to other VMs 120 or other machines. The interface 230 additionally facilitates input and output with one or more adapters 130.

Figure 3:
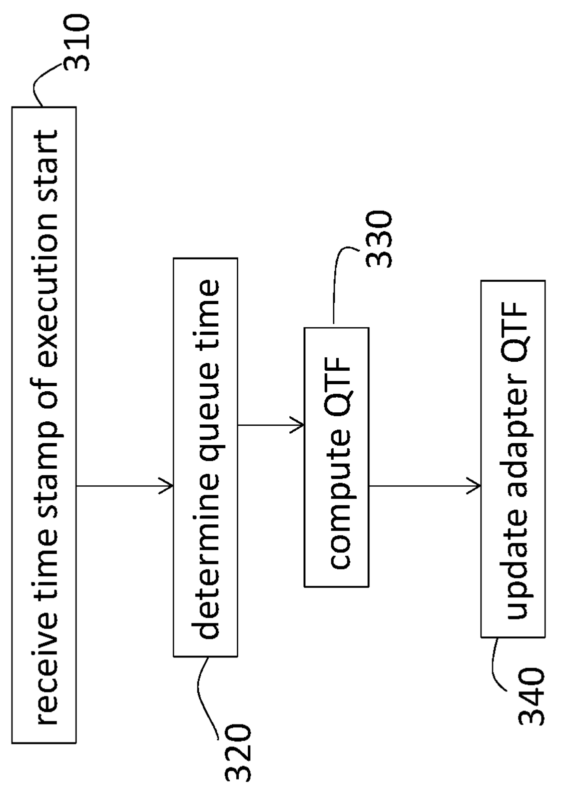
FIG. 3 is a process flow of a method of generating the information needed by a VM to select an adapter according to embodiments.

FIG. 3 is a process flow of a method of generating the information needed by a VM 120 to select an adapter 130 according to embodiments. The processes shown in FIG. 3 begin after processing of a request submitted to an adapter 130 is completed. At block 310, the processes include receiving completion status information from the adapter 130 (at the VM 120) indicating start of execution of the submitted request from the adapter 130. Determining queue time, at block 320, refers to using the time of start of execution in conjunction with a time that the request was submitted to the adapter 130. That is, queue time is the duration from the time of submission of the request to the time that processing of the request by the adapter 130 is started.

Computing QTF, at block 330, is based on the queue time determined at block 320. The QTF is given by:

$$QTF = \frac{\text{queue\_time}}{\text{queue\_depth} + 1} \quad \text{[EQ. 1]}$$

The queue_depth in EQ. 1 refers to the number of submissions by the VM 120 to the same adapter 130 that were already pending at the time of submission of the request for which queue_time is determined (at block 320). As noted above, the VM 120 does not have knowledge of requests submitted to the same adapter 130 by other VMs 120. Thus, the queue depth used to computer QTF is the local queue depth rather than the total queue depth at the adapter 130. EQ. 1 includes (queue_depth+1) in the denominator to ensure that the denominator is not zero when the local queue depth is zero (i.e., there are no pending submissions to the adapter 130 by the VM 120). The value (queue_depth+1) may be referred to as the adjusted queue depth value.

At block 340, updating an adapter QTF value refers to combining the QTF computed after processing of a request by the adapter 130 (at block 330) with previously computed QTF values (computed at block 330 after processing of previous requests). Because an adapter 130 may be shared among two or more VMs 120, more than VM 120 may maintain an adapter QTF value for the same adapter 130. The adapter QTF maintained for a given adapter 130 by a given VM 120 may be an average of QTF values associated with the given adapter 130 at the given VM 120. In alternate embodiments, the adapter QTF may be a weighted average. For example, updating the adapter QTF (at block 340) after computation of another QTF (at block 330) based on processing of another request by the adapter 130 may be given by:

$$\text{latest\_QTF*0.1+previous\_adapter\_QTF*0.9} \quad \text{[EQ. 2]}$$

As the exemplary equation, EQ. 2, indicates, the latest_QTF (associated with the latest processed submission to the adapter 130) is weighted by a factor of 0.1 or 10% while the previous adapter QTF value (previously computed based on previously executed submissions to the same adapter 130) is weighted by a factor of 0.9 or 90%. Other weightings may be used in alternate embodiments. A purpose of the weighting is to minimize the effect of the queue time associated with any single request. That is, if, just prior to the latest submission by the VM 120, another VM 120 made 10 submissions to the same adapter 130, then the queue time for the latest submission by the VM 120 would likely be very long compared with previous queue times (for submissions by the VM 120 to the same adapter 130). To be clear, prior to any subsequent submissions (in fact, prior to the completion of the submitted request with the very long queue time), the 10 submissions by the other VM 120 would be completed and, thus, should no longer be a consideration in the selection of an adapter 130. Thus, weighting the QTF associated with the very long queue time of the latest submission less than the adapter QTF value that was computed prior to this latest submission would prevent the unusually long queue time of the latest submission from skewing the adapter QTF. In the case of the first QTF that is computed at block 330 after the first request from the VM 120 to the adapter 130 is processed (i.e., with no previous QTF values), EQ. 2 indicates that the adapter QTF will be computed as the calculated QTF value*0.1 (because the initial adapter QTF value will be 0).

Figure 4:
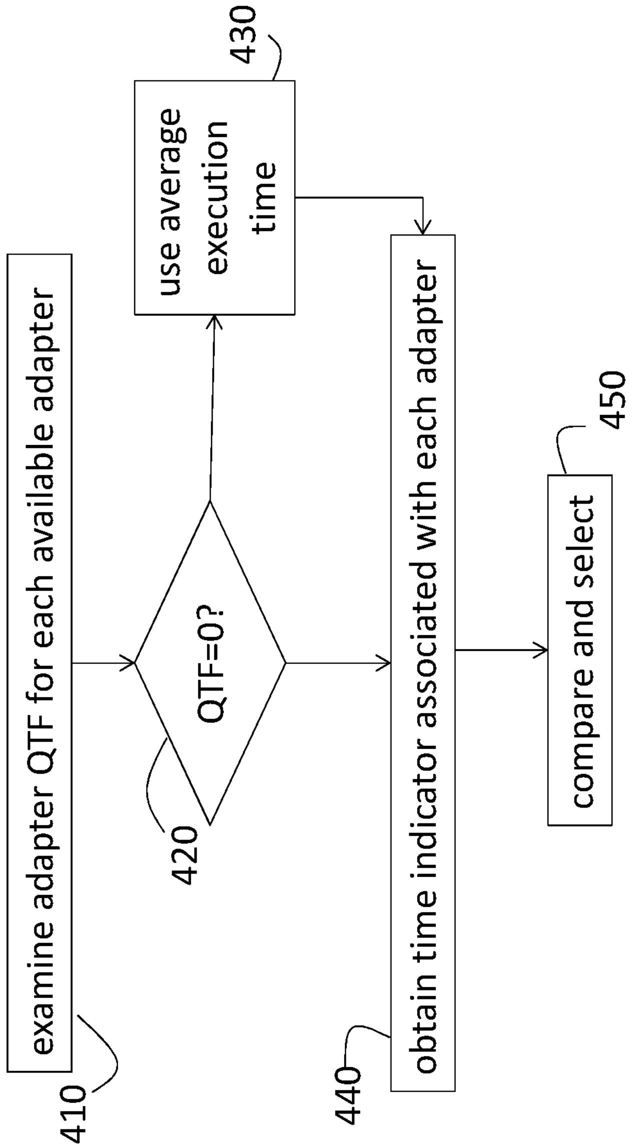
FIG. 4 is a process flow of a method of selecting an adapter at a VM according to embodiments.

FIG. 4 is a process flow of a method of selecting an adapter 130 at a VM 120 according to embodiments. Each VM 120 may implement the processes shown in FIG. 4 each time the VM 120 generates an instruction for a function to be implemented by an adapter 130. The processes shown in FIG. 4 could be implemented by a VM 120 that has a choice of more than one adapter 130 and is not privy to information about what, if any, other VMs 120 also submit requests to any of the available adapters 130. That is, before the processes shown in FIG. 4 are executed, a check may be done by the VM 120 to determine whether more than one adapter 130 is even available. At block 410, the processes include examining adapter QTF values (block 340, FIG. 3) that are updated after completion of each request to each adapter 130. These adapter QTF values give insight into which adapter 130 to choose for a subsequent request, as detailed below. When (at block 420) one or more of the adapter QTFs is found to be 0 (e.g., the adapter 130 has not previously been used by the VM 120), then a default value may be used as the adapter QTF. This default value (at block 430) may be the minimum or the average execution time of adapters 130 that have been used by the VM 120 (for which adapter QTF values are non-zero), for example.

At block 440, obtaining a time indicator associated with each adapter 130 includes using the adapter QTF associated with each adapter 130. Specifically, the time indicator for each adapter 130 may be computed as:

$$\text{time\_indicator} = \text{adapter\_QTF} * \sum_{i=0}^{n-1} (\text{queue\_depth} + 1 + i) \quad \text{[EQ. 3]}$$

In EQ. 3, n is the number of requests submitted at a time and is discussed further below. As in EQ. 1, an adjusted queue depth value (queue_depth+1) is used in EQ. 3. When n=1 (one request is to be submitted to an adapter 130), then EQ. 3 simplifies to:

$$time\_indicator=adapter\_QTF*queue\_depth+1 \quad [EQ. 4]$$

In EQ. 3 and EQ. 4, queue_depth again refers to the local queue depth or the number of pending submissions from the VM 120 to the adapter 130 (for which the time indicator is being computed). This is because, as noted above, the VM 120 does not have knowledge of requests submitted by other VMs 120 to the same adapter 130 (i.e., the VM 120 does not know if the local and total queue depth are different). As a result, the time_indicator in EQs. 3 and 4 is not necessarily the actual queue time for the next request submitted by the VM 120. However, as opposed to using a simple average queue time, which does not account for even the local queue depth, using QTF to obtain the time indicator provides a more accurate relative basis for the comparison (at block 450) of available adapters 130.

The selection of an adapter 130 for submission of one request is discussed first (n=1 in EQ. 3 and EQ. 4 is applicable). Table 1 below shows exemplary comparison values associated with three exemplary adapters 130:

TABLE 1

Exemplary adapter comparison according to an embodiment.

| | adapter_QTF | queue depth (adjusted queue depth) | time indicator |
|---|---|---|---|
| Adapter 1 | 2 | 3 (4) | 8 |
| Adapter 2 | 5 | 1 (2) | 10 |
| Adapter 3 | minimum or average execution time (X) | 9 (10) | X * 10 |
| Adapter 4 | 15 | 0 (1) | 15 |

A comparison of the time indicator values (obtained at block 440) for adapter 1 130 and adapter 2 130 shows the utility of the adapter QTF. That is, if queue depth were the only factor considered, adapter 2 130 would seem a more attractive choice for the next submission from the VM 120. However, as the time indicator shows, adapter 1 130 is actually a better choice than adapter 2 130. Adapter 3 130 has an adapter QTF of 0. Adapter 3 130 may not have completed any submissions from the VM 120 yet, for example. If that adapter QTF (of 0) were used, then adapter 3 130 would look like the best candidate with the lowest time indicator. However, as Table 1 indicates, adapter 3 130 actually has the highest queue depth. To avoid this issue, in the case of adapter QTF=0, the minimum or average adapter execution time may be used as a substitute for the adapter QTF value. This is similar to the discussion above with reference to block 330 (FIG. 3) when the QTF value is 0. The minimum or average execution time is indicated as X in Table 1. Adapter 4 130 has a local queue depth of 0. That is, the VM 120 has no submissions pending at adapter 4 130. If EQ. 4 (the special case of EQ. 3 with n=1) were used with the queue time instead of the adjusted queue time to determine the time indicator, then the time indicator for adapter 4 130 would be 0 because the local queue depth is 0. However, because the adjusted queue depth (queue depth+1) is used instead, the time indicator for exemplary adapter 4 130 is 15 rather than 0. In this case, while using the queue depth (0) would have made adapter 4 130 look like the most desirable adapter 130, using adjusted queue depth (1) makes clear that adapters 1 and 2 130 (and, possibly, adapter 3 130 based on the value of X) are better choices. Comparing and selecting an adapter 130 at block 450 includes selecting the adapter 130 associated with the lowest time indicator (among the time indicator values computed for each available adapter 130). In the exemplary case shown in Table 1, adapter 1 130 would be selected for submission of the next request. After each submission has been processed by the selected adapter 130, the adapter QTF value (for the selected adapter 130) and, thus, the time indicator value for that adapter 130 may be updated and used in the comparison prior to the next selection of adapter 130.

According to another embodiment, batch submission may be performed by a VM 120. In this case, a single adapter 130 is selected and the batch submission (a set of requests) is provided to adapter 130 at once. This type of batch request may be necessary when there is a dependency among the requests, for example, that require all requests to be submitted to the same adapter 130. Unlike the embodiment discussed above, a batch submission does not lend itself to updating adapter QTF and time indicator values between submissions. Instead, the adjusted queue depths for each submission are added according to EQ. 3, as shown in Table 2 below. That is, for example, if the local queue depth is 1 and a batch submission of 3 requests is being considered, an adjusted queue depth of 9 (2+3+4) would be used rather than just an adjusted queue depth of 2 (1+1). This is because the adjusted queue depth would only be 2 for the first of the 3 requests in the batch submission. The adjusted queue depth for the second of the 3 requests would be 3 and the adjusted queue depth for the third of the 3 requests would be 4. Table 2 shows exemplary comparison values for a pending batch submission of different numbers of requests to one of two adapters 130.

TABLE 2

Exemplary adapter comparison according to another embodiment.

| # of submissions in batch | adapter 1 (adapter QTF = 2; adjusted queue depth = 7) time indicator for comparison | adapter 2 (adapter QTF = 6; adjusted queue depth = 1) time indicator for comparison |
|---|---|---|
| 1 | 2 * (7) = 14 | 6 * (1) = 6 |
| 2 | 2 * (7 + 8) = 30 | 6 * (1 + 2) = 18 |
| 3 | 2 * (7 + 8 + 9) = 48 | 6 * (1 + 2 + 3) = 26 |
| 4 | 2 * (7 + 8 + 9 + 10) = 68 | 6 * (1 + 2 + 3 + 4) = 60 |
| 5 | 2 * (7 + 8 + 9 + 10 + 11) = 90 | 6 * (1 + 2 + 3 + 4 + 5) = 90 |
| 6 | 2 * (7 + 8 + 9 + 10 + 11 + 12) = 114 | 6 * (1 + 2 + 3 + 4 + 5 + 6) = 126 |

Table 2 shows the queue depth value according to EQ. 3 for each adapter 130 in the example and shows the time indicator that may be used to compare the adapters 130 for different exemplary batch submission sizes. Batch submissions of 1 to 6 requests are shown in Table 2. As Table 2 indicates, adapter 1 130 is preferable for a batch submission of 6 requests, but for batch submissions of 1, 2, 3, or 4 requests, adapter 2 130 is preferable. For a batch submission of 5 requests, either adapter 1 130 or adapter 2 130 would provide similar performance (similar queue time for the batch request). In the case of a batch submission, the QTF may still be updated. According to one embodiment, the QTF may be updated as each request in the batch is completed. In this case, the n requests in the batch submission are treated as n separate requests for purposes of updating the QTF on the back end, after each submission is processed, even though the requests are treated together at the front end for purposes of selecting an adapter 130, according to EQ. 3. In an alternate embodiment, an average of actual queue times of the batch may be used and may additionally be a weighted average.

According to yet another embodiment, an adapter 130 may process multiple requests concurrently. In this case, the time indicator (estimated queue time) that has been determined for a batch submission must be divided by the number of requests that the adapter 130 can process concurrently. That is, for example, if adapter 1 130 in Table 2 were able to process 2 requests concurrently, then for a batch submission of 6 requests, the time indicator (queue time) of 114 shown in Table 2 would be divided by 2 for comparison purposes.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The flow diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

While the preferred embodiment to the invention had been described, it will be understood that those skilled in the art, both now and in the future, may make various improvements and enhancements which fall within the scope of the claims which follow. These claims should be construed to maintain the proper protection for the invention first described.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method of a machine selecting a selected adapter among two or more adapters that perform a same function, the method comprising:

generating a request, at the machine, for the function;

calculating, using a processor, a time indicator associated with each of the two or more adapters based on a respective adapter queue time factor (QTF) associated with each of the two or more adapters, the adapter QTF associated with each of the two or more adapters being a computed value; and selecting the selected adapter and submitting one or more requests to the selected adapter of the two or more adapters to perform the function based on a comparison of the time indicator associated with each of the two or more adapters, wherein the calculating the time indicator is given by:

$$\text{time\_indicator} = \text{adapter\_QTF} * \sum_{i=0}^{n-1} (\text{queue\_depth} + 1 + i),$$

where time_indicator is the time indicator, adapter_QTF is the respective adapter QTF of the respective adapter, n is a number of the one or more requests, and queue_depth refers to a number of pending requests from the machine at the respective adapter among the two or more adapters at a time of submission of the one or more requests.

2. The computer-implemented method according to claim 1, further comprising determining the adapter QTF associated with each of the two or more adapters based on one or more QTF values, each QTF value being determined based on a submission of a previous request by the machine to the respective adapter.

3. The computer-implemented method according to claim 2, wherein the determining the adapter QTF associated with each of the two or more adapters includes computing an average of the one or more QTF values.

4. The computer-implemented method according to claim 3, wherein the computing the average of the one or more QTF values includes obtaining a weighted average by weighting a most recent QTF value among the one or more QTF values less than other QTF values among the one or more QTF values.

5. The computer-implemented method according to claim 1, wherein the determining the adapter QTF for each of the two or more adapters includes setting the respective adapter QTF to a minimum or average execution time of one or more of the two or more adapters based on the machine not submitting a previous request to the respective adapter.

6. The computer-implemented method according to claim 1, wherein, based on one or more of the two or more adapters being configured to perform concurrent processing, the respective time indicator of each of the one or more of the two or more adapters is divided by a respective number of requests that the respective one or more of the two or more adapters is configured to concurrently process.

* * * * *